United States Patent Office 3,338,774
Patented Aug. 29, 1967

3,338,774
DEVICE FOR MANUFACTURING A LAMINATED PANEL HAVING A CELLULAR INTERNAL STRUCTURE
Fokko Dijksterhuis, Oosternieland, and Heertjen Ubbes Dijksterhuis, Zijldijk, Netherlands
Filed Dec. 16, 1963, Ser. No. 330,966
Claims priority, application Netherlands, Dec. 14, 1962, 286,728
3 Claims. (Cl. 156—472)

The invention relates to a device for manufacturing a laminated panel having a cellular internal structure, said cellular structure being formed from flat material in which tongues have been cut, said tongues being bent so as to be secured to an outer wall at or near their tips and to be secured to another outer wall at residual portions of the material between the roots of the tongues.

The manufacturing of a panel having a cellular internal structure comprising tongues bent perpendicularly to the outer walls is very difficult, if it is to be carried out in a continuous process, because molding rollers are required for bending the tongues perpendicular to the flat material in which they have been cut.

It is impossible to remove the unsupported molded sheet of material, which is to be used as the cellular internal structure of the panel, from the molding roller into which the bent tongues extend, without tearing the residual portions between the tongues apart.

Therefore, before the molded sheet leaves the molding roller an outer plate must be secured to the residual material between the tongues. Before the assembly consisting of the molded sheet together with an outer plate can be removed, however, the molded sheet and the outer plate attached to it must be kept on a considerable part of the circumference of the molding roller.

The drawback of such a method is that the assembly must be flattened later. A sufficient flattening, however, is impossible because the outer plate will not be perfectly flat.

If a laminated panel having a cellular internal structure as described in U.S. Patent No. 3,018,209 is to be made in a continuous process, the manufacturing of the cellular structure must be carried out in several steps. In a first step, a number of cuts are provided in a web of flat material from which the cellular structure is to be made. After the cutting step, the web is displaced to a station for bending out the tongues.

The slightest deviation of the distance over which each web is displaced will accumulate to such an extent that cuts will come completely out of mesh with the places where the tongues are to be bent if each web is a part of a continuous strip of flat material drawn from a supply roll.

An object of the invention is to facilitate a process for manufacturing a laminated panel having a cellular internal structure made from flat material having tongues directed perpendicularly to outer plates of the panel.

According to the invention the new method consists in fixing flat material on a base support and making cuts for the tongues in the flat material on this base, after which the residual portions at the roots of the tongues is pressed into recesses of the base without displacement of the material along the base and an outer plate is connected to the tongues, whilst the residual portions still remain in the recesses in the base.

As a result the cuts will be positioned correctly with respect to the base support and the tongues will be bent out of the surface of the flat material by pressing the residual portions between the roots of the tongues into the recesses of the base.

The material of the residual portions is compressed to some extent and is strengthened at those places where it is subjected to tensions, especially between four adjacent tongues.

A good fixation of the tongues is obtained, because the roots of the tongues are locked in the base and tearing apart of the residual portions during the connection of the center plate at the free tips of the tongues is prevented.

A further object of the invention is the provision of a device for carrying out the novel method for manufacturing a laminated panel having a cellular internal structure.

According to the invention the device comprises a surface provided with intersecting grooves, which surface is to be used as a base support for the material of the cellular internal structure of the panel.

The compression of the material at the residual portions between the tongues can be increased if the base support is shaped as a convex cylindrical surface because the diameter at the bottom of the grooves is less than the diameter of the portions between the grooves. If the material is positioned over a certain part of the circumference the total length of the material at the tips of the tongues is more than the total length of the material at the residual portions in the grooves.

If an outer plate is connected to the tongues of the molded sheet and both are removed from the cylindrical surface, the elasticity of the material in the residual portions will permit the molded sheet to stretch.

Now the cylindrical surface of a molding roller can be used as a base support cooperating with a cutting roller and a die roller and the panel can be manufactured in a continuous process.

The invention will be described with reference to the accompanying drawings in which a preferred embodiment of a device for manufacturing a panel having a cellular internal structure is shown.

Figure 1:
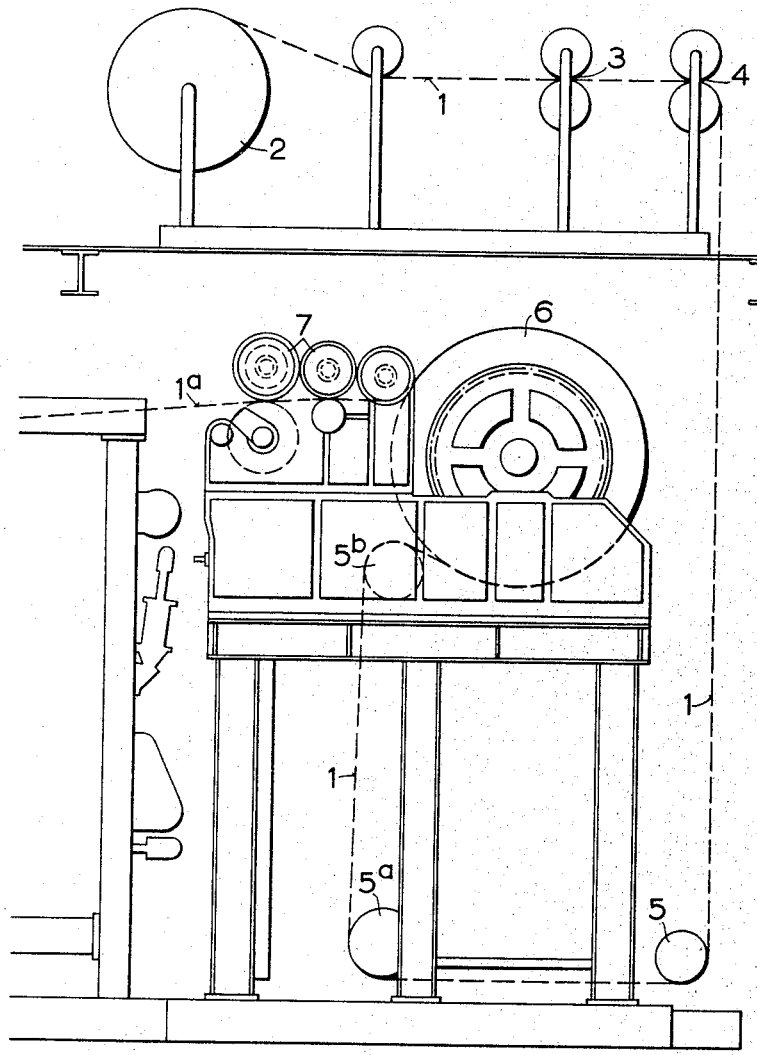
FIG. 1 is a side view of a first part of the device in which continuous material for an outer plate is drawn from a supply roller.

In the device as shown in the FIGS. 1–4 a strip of material 1, e.g. cardboard is unwound from a supply roll 2 by means of rollers 3 and 4. The strip 1 runs over rollers 5, 5a and 5b to a heating roller 6. From the roller 6 the strip passes a glue dispensing device 7 and the upper surface of the part 1a of the strip is provided with glue. Further the part 1a runs around a pressure roller 8 to a molding roller 19. The molding roller 19 is constructed as a heating roller and turns in the direction of the arrow 20.

Another strip of material 21 is unwound from a supply roll 22 by the rollers 23 and 24 and this strip passes over rollers 25 to the molding roller 19. The strip 21 passes between the molding roller and a cutting roller 26 and further it passes a die-roller 27 and a pressure roller 28. The strip 21 is then carried upon the periphery of the molding roller 19 under the strip 1a.

The rollers 26, 27 and 28 cooperate with the molding roller 19 for manufacturing the cellular internal structure from the strip 21, as will be explained later.

As soon as the strip 21 comes into contact with the strip 1a it has already its final cellular shape. Between the strip 1a and the roller 8 an endless belt 29 is situated which runs over the rollers 30 and 31.

The belt 29 presses the strips 1a and 21 tightly to each other and against the molding roller 19.

The roller 30 is adjustable by means of a pneumatic cylinder piston system 32 to stretch the belt 29 and the pressure on the strips 21 and 1a can be adjusted accurately. Pressure roller 8 cooperates with the operative part of the belt.

Figure 2:
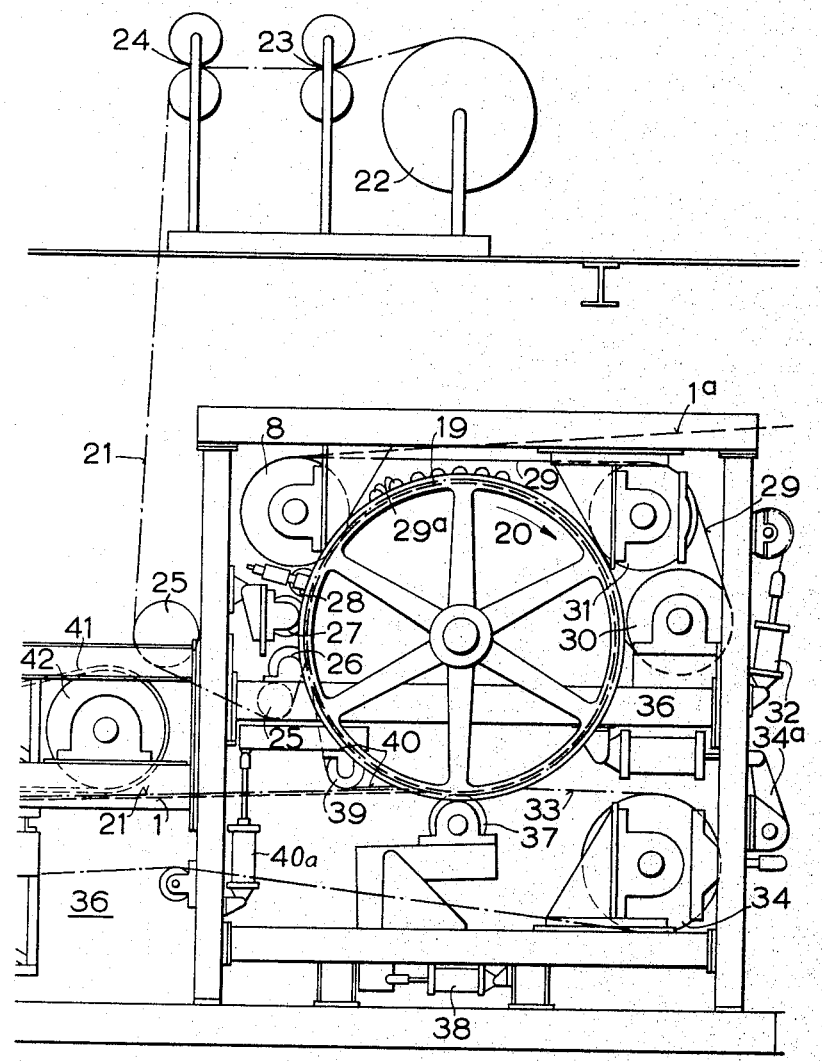
FIG. 2 is a side view of a further part of the device next to the part of FIG. 1 showing the molding roller.
Figure 3:
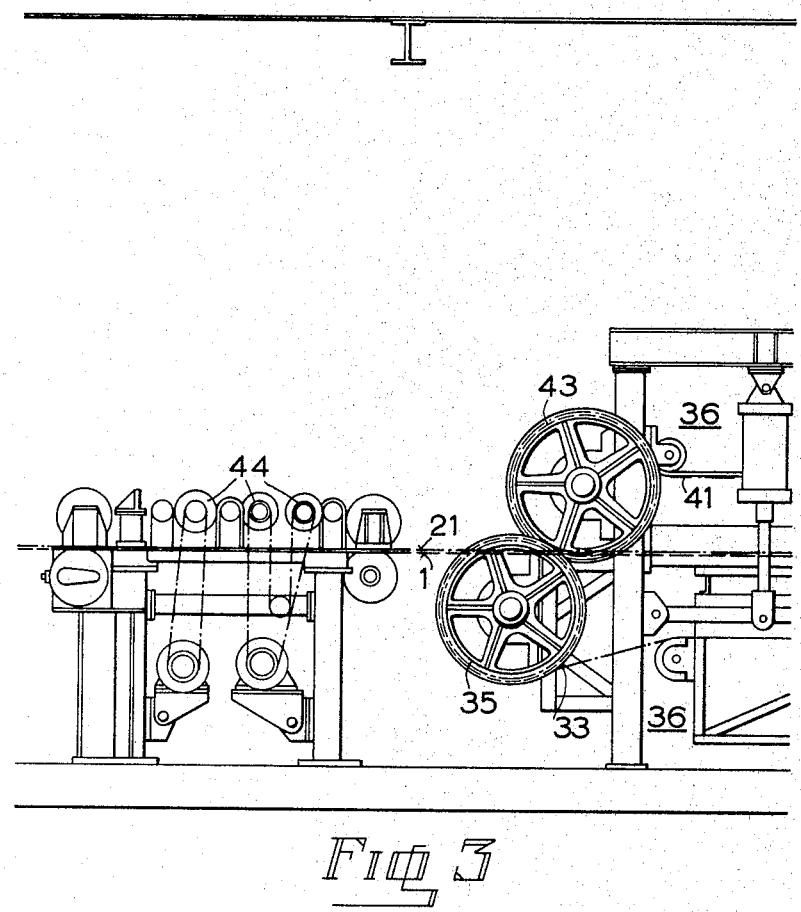
FIG. 3 is a side view of a still further part of the device in which an outer plate connected to a molded sheet runs through a drying tunnel.
Figure 4:
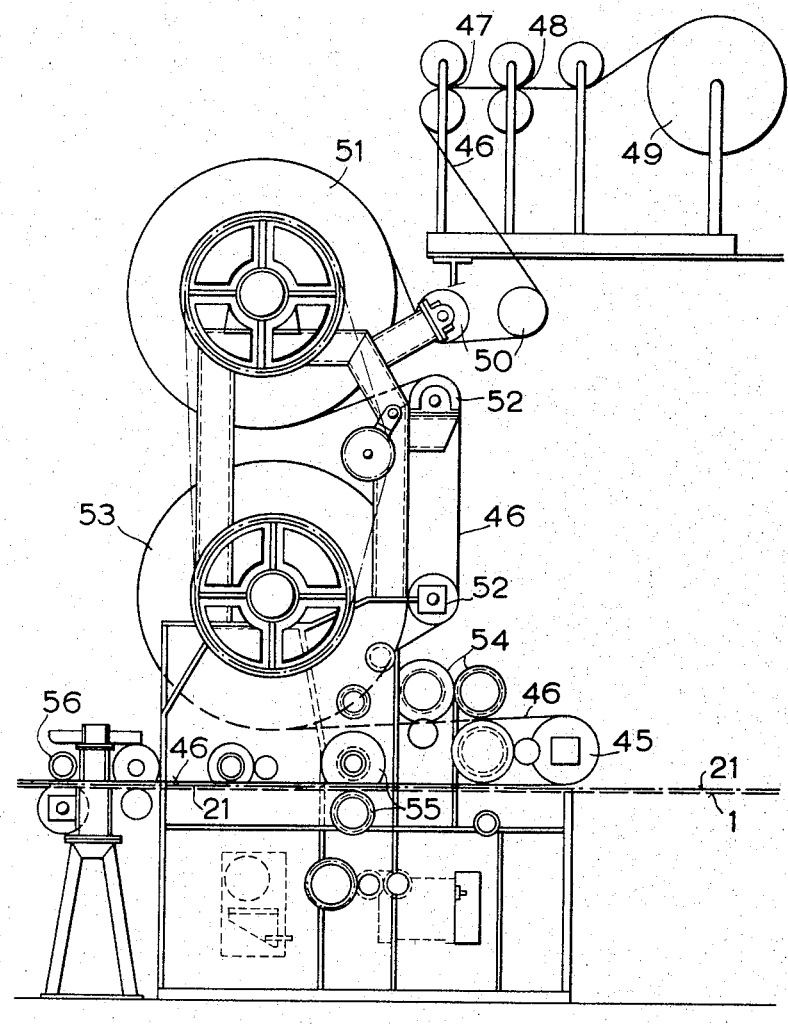
FIG. 4 is a side view of a part of the device next to that of FIGURE 3. In this part a second outer plate is connected to the molded sheet.

An endless belt 33 is situated below the molding roller 19 which belt runs over a roller 34. A lever system 34a is connected to the roller 34, in order to stretch the endless belt 33. The roller 35 at the other end of this endless belt is shown in FIG. 3. The endless belt 33 passes through a drying tunnel generally indicated with 36 (FIGS. 2 and 3). Below the molding roller 19 and below the operative part of the endless belt 33 a pressure roller 37 is situated and the action of the rollers 34 and 37 can be controlled by means of pneumatic cylinder piston systems 38.

Parallel to the molding roller 19 an idler roller 39 is positioned around which small endless belts 40 are situated. Each endless belt 40 is placed in a groove in the molding roller 19. The spacing of the roller 39 from the molding roller 19 can be varied by means of a pneumatic cylinder piston system 40a for stretching the endless belts 40.

By means of these belts the strips 1 and 21 are removed from the molding roller, which strips are further conveyed by the endless belt 33. An endless belt 41 is situated above the strips 1 and 21 and the endless belt 33. The endless belt 41 is stretched by means of the rollers 42 and 43 (FIG. 3), in order to press the strips 1 and 21 tightly together. The space between the belts 33 and 41 is adjustable.

After an outer plate consisting of the strip 1 and a cellular internal structure consisting of the strip 21 are conveyed through the drying tunnel 36 they pass a milling machine (FIG. 3) in which the milling cutters 44 remove portions of the cellular internal structure at places where the material is to be folded later.

If the panels are intended for insulating purposes and no folding of the material is desired, the milling cutters 44 can be brought into an inoperative position.

Further the parts 1 and 21 pass a roller 45 (FIG. 4) for supplying a third strip of material 46 in order to apply a second outer plate.

By means of rollers 47, 48 the strip 46 is unwound from a supply roll 49. The strip 46 passes rollers 50 to a first heating roller 51 and further via the rollers 52 to a second heating roller 53. From the heating roller 53 the strip 46 passes a glue dispensing device 54 and the surface of the strip 46 which comes into contact with the strip 21 is provided with glue. The strips 46, 21 and 1 together pass between pressure rollers 55 and they are closely connected to each other. The assembly of these strips further passes a rim cutting unit 56 and a drying tunnel of about the same shape as the drying tunnel 36 in FIGS. 2 and 3. Then the assembly is ready for use and can be cut into panels.

This continuous and automatic method of manufacturing the panel is made possible by the provision of a special base support, which actually is situated at the cylindrical surface of the molding roller 19 in FIG. 2.

The base support will be described in detail with reference to FIGS. 2 and 5–9. The manufacturing of the cellular internal structure of the panel is executed first by the provision of cuts according to a special pattern in the strip 1. The cuts are made for obtaining tongues, which are to be bent out of the plane of the strip 1. The tips of the tongues are to be bent parallel to the plane of the strip 1 in order to provide surfaces to be glued against the strip 21.

Figure 5:
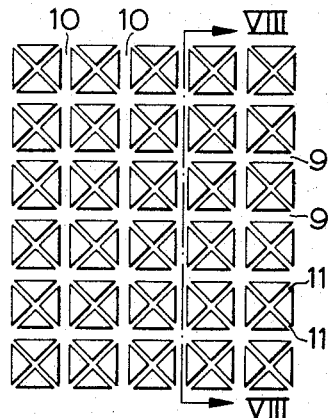
FIG. 5 is a view of the surface of the base support at the circumference of the molding roller.

For this purpose the cylindrical surface of the molding roller 19 is provided with grooves intersecting each other. The grooves 9 in FIG. 5 are parallel to the generating lines of the molding roller 19 and the grooves 10 in this figure are parallel to the circumferential direction of the molding roller 19. The endless belts 40 (FIG. 2) mentioned above are situated in the grooves 10. The grooves 9 and 10 are adapted to contain material of the strip 1, specifically the residual portion between the tongues.

Figure 6:
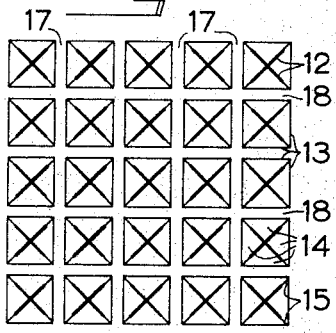
FIG. 6 is a view in accordance with the view of FIG. 5, but of a sheet of material in which cutting lines and folding lines for the tongues are indicated.

The squares between the grooves 9 and 10 are provided with diagonal grooves 11. In these grooves the knives for cutting the tongues can penetrate. Preferably the tongues are cut according to a pattern as indicated in FIG. 6, in which the cuts are indicated with heavy lines 12. The cuts do not extend into the edges of the squares formed by the folding lines 13.

In each square four tongues 14 are provided which can be bent out of the plane of the strip 1. During bending of the tongues the cuts extend by tearing the material into the edges formed by the folding lines 13. Each rent is indicated with lines 15. The cuts 12 in the strip 1 fixed at the circumference of the molding roller 19 are provided by means of the cutting roller 26. The cutting roller 26 (Fig. 8) is provided with cross knives 57 at its circumference. One of the knives 57 is indicated in the cross-section of the roller 26 in a perspective view. The cutting roller 26 is synchronized with the molding roller 19.

As soon as the edges 58 of the knives 57 touch the strip 1 the material will be penetrated by them and the edges of the knives reach into the grooves 11 of the molding roller. The strip 1 still remains at the outer circumference of the molding roller.

The material further passes a die-roller 27. The cylindrical circumference of this roller is provided with ridges. The ridges 59 are parallel to the circumferential direction of the roller 27 and the ridges 60 are parallel to the generating lines thereof. A perspective view of the ridges is indicated in the cross-section of the roller 27.

The ridges of the roller 27 cooperate with the grooves in the molding roller 19. The ridges 59 and 60 can penetrate in the grooves 10 and 9 respectively. The thickness of the ridges 59 and 60 is such that material of the strip 1 tightly fits between the side-walls of the ridges and the side-walls of the grooves 9 and 10.

The residual portions of the material of the strip 1 between the tongues is pressed into the grooves by the ridges, as result of which the tongues are positioned with respect to the circumference of the molding roller 19. The residual portions are indicated with the reference numerals 17 and 18 of FIGS. 6 and 7.

Figure 7:
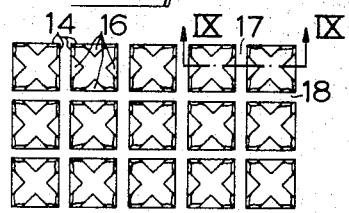
FIG. 7 is a view as indicated in FIG. 6, but showing the sheet in its final shape.
Figure 8:
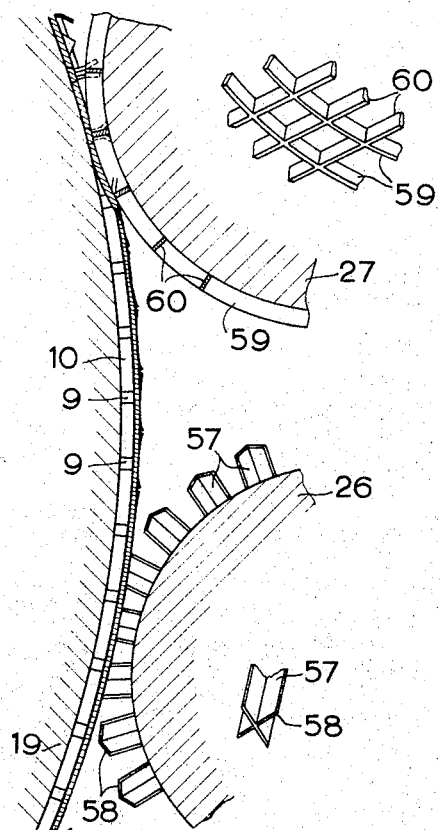
FIG. 8 is a cross-section of a part of a molding roller cooperating with a cutting roller and a die roller.
Figure 9:
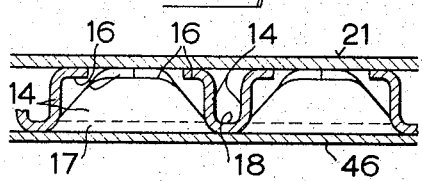
FIG. 9 is a section along the lines IX—IX in FIG. 7 through a panel having a cellular interior structure, manufactured by a method according to the invention.

After the strip has passed the die-roller 27 it is shaped as indicated in FIG. 7. By means of a roller 28 the tips of the tongues indicated with the reference numeral 16 are bent parallel to the residual portions 17 and 18. A strip 21 is to be glued on the tips 16 at the circumference of the molding roller.

At the circumference of the molding roller the total length of the material of the strip 21 is more than the total length of the material of the residual portions 17 in the grooves 10.

When both strips 1 and 21, which are glued together, are removed from the molding roller the compressed material in the residual portions 17 can extend and the assembly consisting of the molded strip 1 and the flat strip 21 will stretch.

Further the strip 46 can be glued to the residual portions 17 and 18 in order to obtain a panel consisting of two outer plates having a cellular internal structure.

We claim:
1. A device for manufacturing a laminated panel having a cellular internal structure, comprising a cylindrical base for receiving on its periphery a flat sheet of material and supporting the sheet while it is being molded to form the internal structure of the panel, and apparatus for securing an outer sheet to the formed internal structure while such structure is still supported on the base, wherein the improvement comprises a network of intersecting grooves on the periphery of the cylindrical base, a cutter for engaging the periphery of the cylindrical base, comprising blades which are arranged to bear against the spaces bounded by the grooves and which are shaped to cut tongues in a flat sheet of material supported on the base, and a die member comprising ridges shaped to fit into the grooves in the base, for engaging a flat sheet in which such tongues have been cut, to press into the grooves the residual portions of the sheet at the roots of the tongues, leaving the tongues extending from the grooves for securement to the outer sheet.

2. A device according to claim 1 wherein the cylindrical base is in the form of a rotating roller for carrying on its periphery a continuous strip of material and supporting the strip while it is being molded to form the internal structure of the panel, and the cutter and die member rotate at the same peripheral speed as such roller.

3. A device according to claim 2 wherein some of the grooves on the periphery of the cylindrical base extend circumferentially, and such circumferentially extending grooves carry endles belts which underlie the residual portions of the sheet in the grooves and which run over an idler to strip from the cylindrical base the formed internal structure and the outer sheet secured thereto.

References Cited
UNITED STATES PATENTS

| | | | |
|---|---|---|---|
| 2,502,113 | 3/1950 | Walker | 161—110 |
| 3,008,551 | 11/1961 | Cole | 161—110 |
| 3,011,602 | 12/1961 | Ensrud et al. | 161—110 |
| 3,018,209 | 1/1962 | Dijksterhuis et al. | 161—110 |

EARL M. BERGERT, *Primary Examiner.*

DOUGLAS J. DRUMMOND, *Examiner.*